United States Patent [19]

Cameron

[11] Patent Number: 4,648,623

[45] Date of Patent: Mar. 10, 1987

[54] VEHICLE SUSPENSION STRUT WITH LOWER ROTARY BEARING CUP ASSEMBLY FOR A DIRIGIBLE ROAD WHEEL

[75] Inventor: David S. Cameron, Grosse Pointe Woods, Mich.

[73] Assignee: General Motors Corporation, Detroit, Mich.

[21] Appl. No.: 834,396

[22] Filed: Feb. 28, 1986

[51] Int. Cl.$^4$ .................... B60G 15/06; B60G 17/00
[52] U.S. Cl. .................................... 280/711; 280/688
[58] Field of Search ............. 280/688, 702, 711, 712; 267/153, 113, 64.11, 64.21, 64.24

[56] References Cited

U.S. PATENT DOCUMENTS

| | | | |
|---|---|---|---|
| 3,399,905 | 9/1968 | Vogel | 280/702 |
| 3,666,287 | 5/1972 | Wanner | 280/711 |
| 4,162,091 | 7/1979 | Sano | 280/702 |
| 4,168,840 | 9/1979 | Graham | 280/6 R |
| 4,325,567 | 4/1982 | Hendrickson | 280/711 |
| 4,345,773 | 8/1982 | Brown | 280/6 R |
| 4,443,026 | 4/1984 | Harrison | 280/702 |
| 4,500,112 | 2/1985 | Raidel | 280/702 |
| 4,531,759 | 7/1985 | Rezanka et al. | 280/688 |

Primary Examiner—Richard A. Bertsch
Attorney, Agent, or Firm—Charles R. White

[57] ABSTRACT

A lower bearing air strut which moves the point of steering rotation of a dirigible road wheel to the bottom of the reservoir of the strut. This provides improved support between the road wheel assembly and the air strut and allows the air spring to be leak tested prior to vehicle assembly. The upper mount is fixed to the mounting tower by a retainer ring so it does not rotate and provides improved sealing of the upper extremity of the air spring.

4 Claims, 2 Drawing Figures

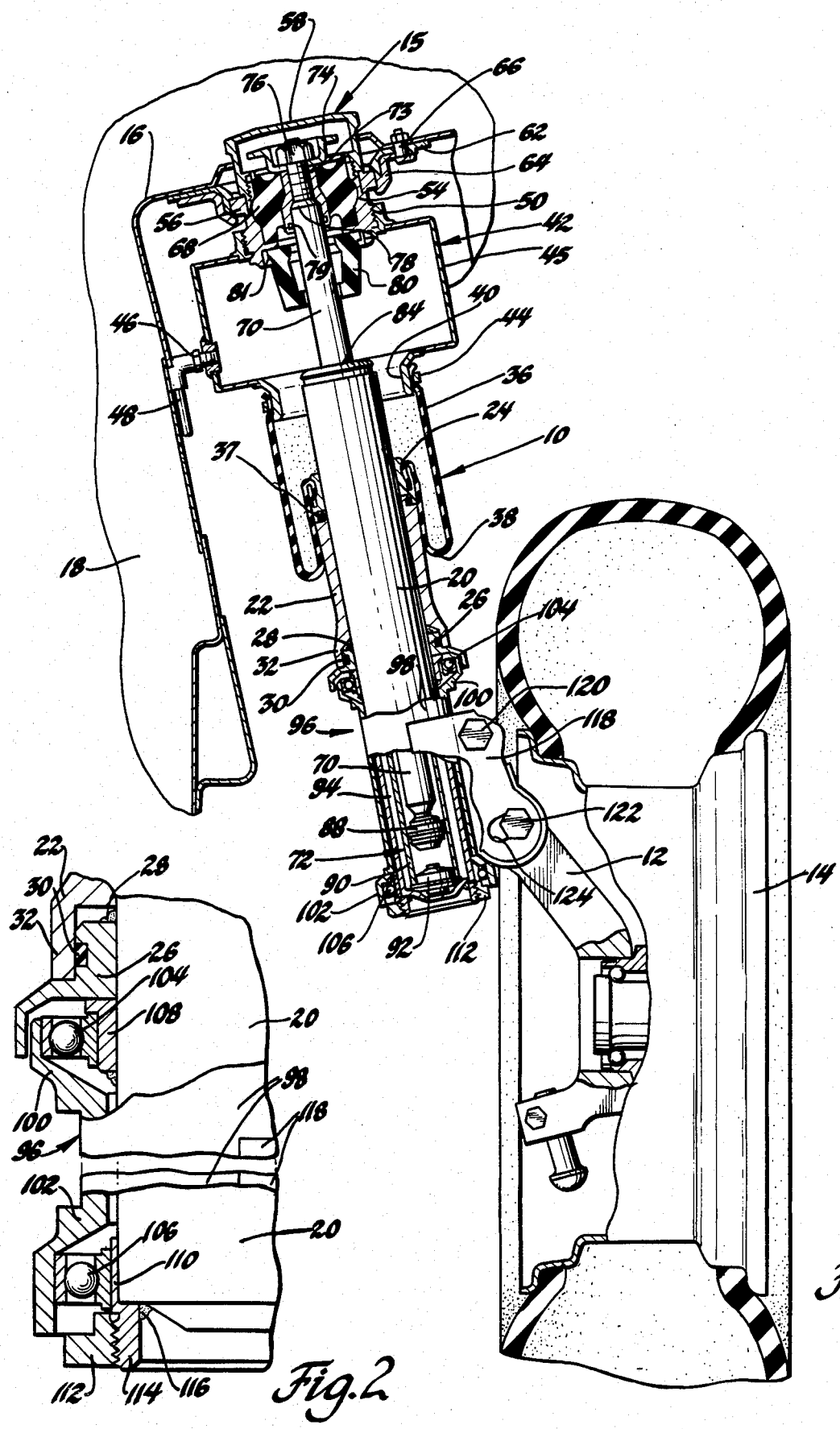

VEHICLE SUSPENSION STRUT WITH LOWER ROTARY BEARING CUP ASSEMBLY FOR A DIRIGIBLE ROAD WHEEL

This invention relates to vehicle suspensions and more particularly to a vehicle suspension strut incorporating a new and improved lower bearing cup assembly steerably mounting a road wheel assembly to the strut.

The present invention is drawn to a MacPherson type suspension strut mounted to a steerable road wheel by a new and improved lower bearing cup assembly which mounts the strut and the dirigible wheel for relative turning motion for steering purposes. With this invention, the road wheel can be steered without imparting any appreciable turning of the strut and therefore no turning of an air suspension unit supported on the outer tube of the strut. With the elimination or sharp reduction of steering forces on the strut, only static fluid seals for the air springs are employed so that seal wear is reduced and service life is increased. This also eliminates rotation of air supply lines, electric wires of solenoid valves or other controls to eliminate fatigue of such connections for longer service life. Also this invention can be effectively employed with a coil spring suspension mounted between the outer support tube of the strut and tower in the vehicle body. This invention further provides for a simplified upper mount for both coil and air springs and eliminates rotary bearings generally found in upper strut mounts. In the preferred embodiment of this invention, a lower cylindrical bearing cup assembly receives the lower extremity of an air spring strut. Upper and lower ball bearings within the cup have inner diameter contact with the support tube of the strut to form anti-friction devices for easy steering while carrying the vehicle load moments. With the point of steering rotation moved to the lower end of the strut, the air spring can be effectively leak-tested prior to assembly. With this invention, relative rotary movement between the hydraulic damper components of the strut such as the piston rod and seal is minimized so that service life is increased.

These and other features, objects and advantages of this invention will be more apparent from the following detailed description and drawing in which:

FIG. 1 is a front elevational view partly in cross-section of a pneumatic suspension spring strut mounted to vehicle body work and rotatably supporting a dirigible road wheel assembly.

FIG. 2 is an enlarged view of a fragment of a lower portion of FIG. 1 illustrating part of the suspension strut and the strut support cup of this invention.

Turning now in greater detail to the drawing, FIG. 1 shows a pneumatic spring suspension strut 10 operatively connected at its lower end to the steering knuckle 12 of a steerable road wheel and hub assembly 14. The strut is secured at its upper end by an upper mount assembly 15 to a tower 16 formed in the sheet metal or other body work 18 of a motor vehicle. The strut 10 has an elongated outer support tube 20 on which a cylindrical air spring piston 22, profiled to have a varying diameter outer surface, is secured. More particularly, the air spring piston 22 is mounted between collar-like retainers 24 and 26, the latter being secured in an air-tight manner to the support tube 20 by annular weld 28 or any suitable alternative fastening device. A static O-ring seal 30 operatively seated in an annular groove in retainer 26 sealingly engages the inner wall of flange 32 of the air spring piston to block leakage of pressurized air from the air spring of this strut. The upper retainer 24 has a shoulder which is grooved to receive the inner and lower end of a fabric reinforced elastomeric air sleeve 36. The outer periphery of this retainer is constricted radially inwardly after sleeve insertion so that the walls defining the groove securely grips the end of the air sleeve to eliminate the inner clamping ring of prior art constructions. O-ring 37 interposed between the upper retainer 24 and the air spring piston blocks air leakage from the air spring of this strut.

From connection with the upper retainer 24, the air sleeve 36 extends downwardly along the profiled outer surface of the air spring piston 22 to a reversely curved rolling lobe 38. The air sleeve extends upwardly from the rolling lobe generally concentric with the support tube 20 onto the cylindrical and downwardly extending neck 40 of an air can 42. A circular clamp 44 is constricted to secure the upper end of the air sleeve to neck 40 in an airtight manner. The air can 42 is a fixed, non-rotatable member that has a cylindrical main body 45 which is connected by a fitting 46 and air line 48 to a suitable vehicle level control system for controlling the air pressure within the pneumatic spring of this strut. Such a control system can be found in U.S. Pat. No. 4,168,840, issued Sept. 25, 1979, to D. E. Graham entitled "Motor Vehicle Level Control Circuit" assigned to the assignee of this invention and herein incorporated by reference. The can 42 has an upwardly extending neck 50 fixed thereto which threads onto the end of a generally cylindrical retainer 54 shouldered to carry a thick connector ring 56. As illustrated, this ring is trapped on a shoulder of the retainer 54 by a large cover nut 58 that tightly threads onto the upper end of the retainer. The connector ring 56 is a stationary one-piece ring that replaces a conventional upper bearing assembly used as in many upper mount constructions since there is no relative turning movement during the steering of the vehicle at this particular loction. The outer periphery of the connector ring 56 is trapped between upper and lower strut mounting plates 62 and 64 secured to the tower 16 by threaded fasteners 66. Mounted within the retainer 54 is an elastomeric cylindrical ring 68 which forms a spring that connects the piston rod of a hydraulic damper 72 employed in this strut. More particularly the cylindrical ring 68 is bonded at its inner diameter to a retainer sleeve 73 that is in turn secured to the upper end of the piston rod 70 by a cup-shaped washer member 74 and a nut 76 threaded onto the end of the piston rod so that the sleeve is seated on a shoulder 78 on the piston rod. Seal 79 between the piston rod 70 and the retainer sleeve 73 is a static seal to prevent air leaks. The elastomer ring 68 is worked in shear for a selected low spring rate by the piston rod on jounce and rebound operations as the piston strokes in the damper. A downwardly extending elastomeric jounce bumper 80 is secured to the shouldered bottom of the retainer 54 by a fastening ring 81 press-fitted into the lower internal diameter of the retainer. This bumper is a resilient cylindrical cushion which deflects on contact with the cover plate 84 secured to the top of the support tube 20 to cushion jounce motions such as might occur when driving a vehicle over rough roadway.

As shown in FIG. 1, the piston rod 70 carries a valved piston 88 at the lower end thereof which operates in an oil-filled cylinder tube 90. The cylinder tube has a conventional base valve 92 mounted at the lower end thereof which controls the flow of hydraulic fluid between the cylinder tube and the reservoir 94 formed by the annular space between the cylinder tube 90 and the support tube 20.

This invention provides improved support and steering of the road wheel assembly that may be steered through a steering gear such as disclosed in U.S. Pat. No. 3,951,045, issued Apr. 20, 1976, to W. R. Frei et al assigned to the assignee of this invention and herein incorporated by reference. As shown in the Figures, there is a lower bearing cup assembly 96 comprised of a cylindrical main body 98 with cupped upper and lower ends 100 and 102 that receive the upper and lower ball bearing assemblies 104 and 106. The inner annular races of these bearing assemblies have inner diameter contact with the upper and lower bearing supports 108 and 110 welded or otherwise secured to the support tube 20. A support nut 112 is threaded onto the downwardly extending end 114 of the bearing support 110 to retain the bearing assembly 106 and the bearing cup assembly in position. Weld 116 secures the lower bearing support 110 to the support tube 20. Welded to either side of the cylindrical body 98 of the cup assembly are a pair of side-by-side flat connector plates 118 only one of which is shown. These plates in conjunction with the body 98 form a "beer mug" shaped lower bearing support that is mounted to the steering knuckle 12 by bolt means 120 and 122. Bolt 122 is slidable in an arcuate slot 124 in the plates 118, as the road wheel 14 is pivoted about the axis of the bolt for camber adjustment. After such adjustment, the bolts 120 and 122 are fully tightened down to maintain the adjustment.

In operation, the rolling load air spring provides the spring suspension for the vehicle whose motions are damped by the strut damper. The road wheel and lower bearing cup assembly can be turned relative to the suspension strut so that there are no appreciable turning loads applied to the suspension strut and the spring components mounted thereto. Accordingly, the the air spring seals are all static so that there is reduced seal wear as compared to dynamic or relatively rotatable seals. This reduces potential for air leakage and early seal replacement. Since there is no steering rotation of any part of the strut, the air lines such as air line 48 are not subject to turning motions so that service life is extended. The strut and the air spring can be leak-tested with pressurized air being fed into the air spring through fitting 46 prior to installation of the strut into the rotary bearing cup assembly with such testing air spring operation is assured and assembly is improved. With the bearing being in the cup assembly, the upper mount construction is simplified with the elimination of rotary bearings in the mount construction.

While a preferred embodiment of the invention has been shown and described to illustrate the invention, other modifications will become apparent to those akilled in the art. Accordingly, the scope of this invention is set forth in the following claims.

The embodiments of the invention in which an exclusive property or privilege is claimed are defined as follows:

1. Spring suspension strut for operatively connecting a dirigible road wheel assembly to support structure in a vehicle comprising a lower bearing cup operatively mounted to a steering knuckle of the road wheel assembly, a suspension strut, said strut having a cylindrical outer support tube with a lower extremity mounted in said lower bearing cup and extending upwardly therefrom, said strut having a piston operatively mounted therein and having a piston rod extending outwardly therefrom, upper mount means connecting said piston to the support structure. suspension spring means operatively mounted between said support tube and said upper mount means, and bearing means interposed between said lower cup and said lower extremity of said outer support tube so that said steering knuckle and said road wheel can be turned relative to said suspension strut for steering said road wheel assembly.

2. The suspension strut of claim 1 wherein said suspension spring means comprises an air spring operatively mounted between said support tube and said upper mount and static air seal means are interposed between said air sleeve and said strut.

3. An air spring suspension strut for operatively connecting a dirigible road wheel assembly to support structure of a vehicle comprising a base cup secured to a steering knuckle of the road wheel assembly, said suspension strut having an elongated and cylindrical support tube mounted in said base cup and extending upwardly therefrom, first and second spaced bearings operatively mounted between said support tube and the cup to permit said cup to be turned relative to said support tube as said dirigible wheel is steered, said strut having a cylinder tube operatively mounted therein, a piston and piston rod assembly operatively mounted in said cylinder tube and extending outwardly therefrom and from said support tube, an upper mount connecting said piston rod to said support, an air spring assembly operatively secured to said upper mount and forming a rolling lobe air spring connection with said support tube and static seal means statically sealing the air spring between said suspension strut and said upper mount.

4. Spring suspension strut or a vehicle and operatively connecting a dirigible road wheel assembly to support structure in the vehicle comprising a lower bearing cup connected for steering movement with a steering knuckle of the road wheel assembly, a suspension strut, said strut having a cylindrical outer support tube with a lower extremity mounted in said lower bearing cup and extending upwardly therefrom, said strut having a piston operatively mounted therein and having a piston rod extending outwardly therefrom, upper mount means connecting said piston to the support structure, suspension spring means operatively mounted between said support tube and said upper mount means, and bearing means interposed between said lower cup and said lower extremity of said outer support tube so that said steering knuckle and said road wheel can be turned relative to said suspension strut for steering said road wheel assembly, said upper mount means having an annular ring member fastened to the support structure of the vehicle to retard rotation of said upper mount and said spring means secured thereto.

* * * * *